United States Patent [19]

Morioka et al.

[11] Patent Number: 4,732,362
[45] Date of Patent: Mar. 22, 1988

[54] SOLENOID VALVE ASSEBLY

[75] Inventors: Hiroaki Morioka, Okazaki; Mamoru Nakamura, Kariya, both of Japan

[73] Assignee: Aisin Seiki Kabushiki Kaisha, Japan

[21] Appl. No.: 929,883

[22] Filed: Nov. 13, 1986

[30] Foreign Application Priority Data

Nov. 13, 1985 [JP] Japan .................. 60-254215

[51] Int. Cl.⁴ .............................. F16K 31/06
[52] U.S. Cl. .................. 251/129.17; 251/129.18; 251/129.15
[58] Field of Search ............ 251/129.08, 129.17, 251/129.18, 129.07, 129.15

[56] References Cited

U.S. PATENT DOCUMENTS

| | | | |
|---|---|---|---|
| 4,245,815 | 1/1981 | Willis | 251/129.08 |
| 4,481,699 | 11/1984 | Knapp et al. | 251/129.17 X |
| 4,569,504 | 2/1986 | Doyle | 251/129.15 |
| 4,635,683 | 1/1987 | Nielsen | 251/129.18 X |

FOREIGN PATENT DOCUMENTS 1031072 5/1958 Fed. Rep. of Germany .................. 251/129.15

Primary Examiner—Arnold Rosenthal
Attorney, Agent, or Firm—Sughrue, Mion, Zinn, Macpeak, and Seas

[57] ABSTRACT

A collision between members is prevented as a movable part moves. A guide member is disposed along a diaphragm which supports a valve element. The guide member have a curved surface which the diaphragm, whereby a region of the guide member where it abuts against the diaphragm shifts. By shifting the fulcrum for the diaphragm, an operating response is achieved which stops the movement of the valve element before a gap between it and a core of magnetizable material reduced to zero as the valve element is attracted by the core. To define a positive change in the position of the fulcrum, the guide member is formed of a metallic material. The guide member is formed with openings to reduce its rigidity.

12 Claims, 9 Drawing Figures

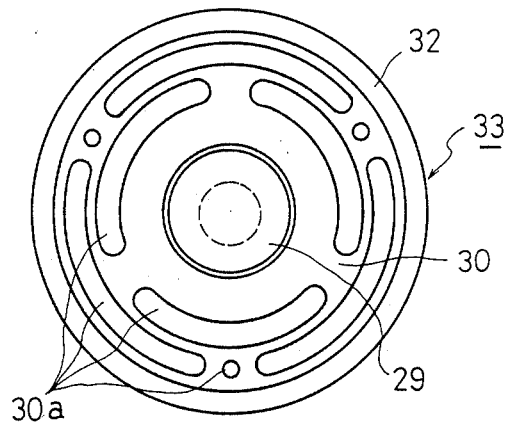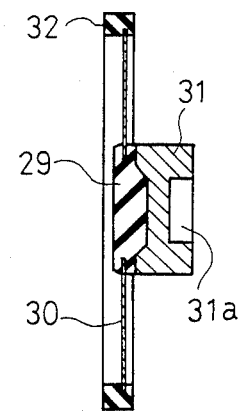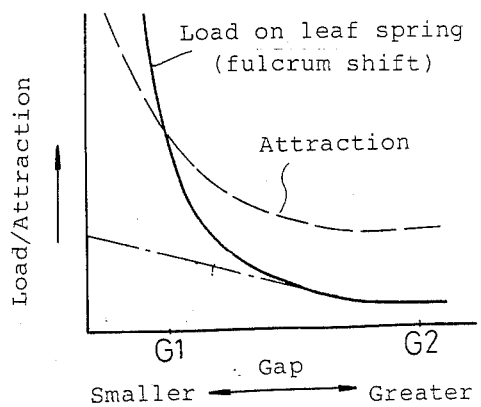

SOLENOID VALVE ASSEBLY

BACKGROUND OF THE INVENTION

The invention relates to a solenoid valve assembly of on/off type, which may find its application as a control valve for controlling the suction of an automobile, for example, in which a valve element which opens or closes a fluid path is repeatedly operated in an on/off manner so that a flow rate can be controlled by adjusting the duty cycle or the ratio of the on period to the off period.

In a solenoid valve assembly of the type described, a movable part or valve element is generally supported by a diaphragm in a displaceable manner, and a stationary core is disposed in opposing relationship with and close to a movable core which is secured to the valve element so that when the stationary core is excited magnetically by energizing an electrical coil, the movable core is held attracted by the stationary core. The movement of the movable core opens or closes the clearance defined between the valve element and the valve seat, and hence the fluid path of the valve.

In the solenoid valve assembly constructed in the manner mentioned above, a collision occurs between the movable and the stationary core as the movable core is attracted by the stationary core. Such collision is inevitable in a conventional solenoid valve. Consequently, in applications which employ a duty control in which the on/off operation is frequently repeated within a reduced length of time, percussion sounds of an increased magnitude occur continually, and the abrasion of parts which collides against each other shortens the useful life of the valve assembly.

SUMMARY OF THE INVENTION

It is an object of the invention to avoid a collision which results from a movement of a movable part in a solenoid assembly.

The above object is accomplished in accordance with the invention by the provision of a guide member having a guide surface formed thereon including a region disposed for abutment against flexible support means carrying the valve element and which changes between at least two modes in accordance with the displacement of the valve element.

Before describing the invention, the operation which is involved with a collision of a movable core against a stationary core will be considered first. Flexible support means, for example, a diaphragm, is generally supported at predetermined fixed positions around its periphery, and hence there results a substantially proportional relationship between the load applied to the flexible support means and a displacement thereof as indicated by a single dot chain line curve in in FIG. 4. On the other hand, the force of attraction increases with a reducing gap between the stationary and the movable core, in a manner indicated by a broken line curve in FIG. 4. The movable core comes to a stop at a location where the load applied to the flexible support means is balanced with the force of attraction applied thereto. It will be seen from FIG. 4 that the force of attraction always remains greater. If the magnitude of the force of attraction is reduced, the flexible support means cannot be moved when its displacement is equal to zero. As a consequence, the movable core which is supported by the flexible support means must be displaced into collision with the stationary core before it is stopped. To eliminate this result, it is necessary that the relationship between the load applied to and the displacement of the flexible support means be changed. Thus, if a response is obtained in which the load which depends on the displacement of the flexible support means undergoes a greater change than a change in the force of attraction as indicated by a solid line curve in FIG. 4, the load and the force of attraction can be balanced before the gap reduces to zero, thus effectively avoiding a collision.

Accordingly, such response is realized in accordance with the invention by shifting the fulcrum of the flexible support means. By way of example, a guide member having a curved guide surface may be disposed in opposing relationship with the flexible support means so that when the movable core is attracted or at normal times, the flexible support means bears against the curved surface which is defined on the guide member and is deformed in conformity to the curved surface. Thus, the region of abutment will change continuously in accordance with the displacement of the flexible support means. Stated differently, the movement of the flexible support means will be controlled by the region of abutment which is located inside the peripheral positions where it is supported by a casing, and hence it will be deformed about a fulcrum which is defined as the innermost position within the region of abutment. The fulcrum shifts in this manner. Consequently, the response as indicated by a solid line curve in FIG. 4 is obtained, thus avoiding the occurrence of a collision. Since the invention is operable in accordance with the principle described above, it is only necessary that the flexible support means includes a shifting of at least one fulcrum. Consequently, the configuration of the guide surface is not limited to a curved surface, but rather a polygonal surface which represents a fold line approximation of the curved surface may be employed.

In a solenoid valve assembly of the type described, it is necessary that the movement of the movable core be stopped at a consistently uniform position in order to avoid variations in the operation. However, the location of the fulcrum is not sharply defined with a diaphragm which is formed of rubber as used in the prior art, and its response is susceptible to changes by influences of temperature or the like, failing to provide a stabilized operation. Accordingly, in a preferred embodiment of the invention, the flexible support means is formed of a metal so that a change in the fulcrum is positively defined, and the flexible support means is formed with an opening in order to reduce the rigidity.

Other objects and features of the invention will become apparent from the following description with reference to an embodiment thereof with reference to the drawings.

BRIEF DESCRIPTION OF THE DRAWINGS

FIGS. 3a and 3b are a right-hand side elevation and a longitudinal section, to an enlarged scale, of a valve element shown in FIG. 1;

FIG. 4 graphically shows the relationship between the load and the force of attraction on one hand and the gap between the stationary and the movable core;

DESCRIPTION OF PREFERRED EMBODIMENTS

Figure 1:
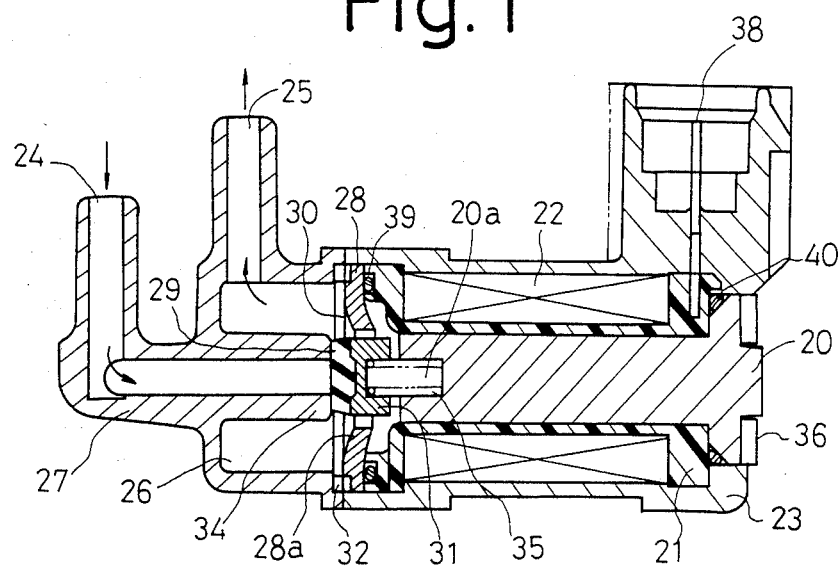
FIG. 1 is a longitudinal section of a solenoid valve assembly according to one embodiment of the invention.
Figure 2:
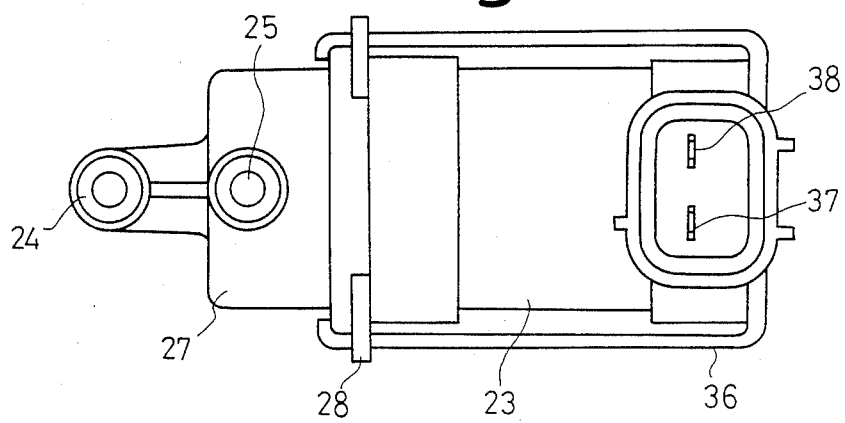
FIG. 2 is a plan view of the assembly shown in FIG. 1.

Referring to the drawings, several embodiments of the invention will now be described. FIG. 1 shows a solenoid valve assembly according to one embodiment of the invention in longitudinal section, and FIG. 2 shows the assembly of FIG. 1 in plan view. Referring to FIGS. 1 and 2, the assembly includes a casing 23 which is formed of a non-magnetic material and containing a stationary core 20, a bobbin 21 and an electrical coil 22 therein. The coil 22 is disposed around the bobbin 21, which is also formed of a non-magnetic material and is fitted around the stationary core 20. A body 27 is formed of a non-magnetic material and is coupled to the casing 23. A fluid path 26 is formed within the body and communicates with ports 24, 25 which open to the outside of the body 27. The body 27 is formed with a valve seat 34, which is disposed in opposing relationship with a valve element 29. A movable core 31 is integrally secured, as by staking, to the valve element 29. A metallic leaf spring 30 in the form of a doughnut is secured around the valve element 29. Annular lip 32 is integrally secured, as by staking, to the outer periphery of the leaf spring 30. The lip 32 is effective to allow the leaf spring 30 to be supported by the casing 23 and the body 27 and to hermetically seal the chamber 26.

A valve element subassembly 33 including the valve element 29, the leaf spring 30, the movable core 31 and the lip 32 is shown in greater detail in FIGS. 3a and 3b. In these Figures, it will be noted that the leaf spring 30 is formed with a plurality of circumferentially oblong openings and small circular openings 30a, which are effective to reduce the rigidity of the leaf spring 30. The movable core 31 is normally urged by a coiled compression spring 35, disposed in a recess 30a of the stationary core 20, in a direction away from the core 20, whereby when the coil 22 is deenergized, the valve element 29 abuts against the valve seat 34 to maintain the fluid path closed. In this example, the displacement of the leaf spring 30 is equal to zero when the valve element 29 abuts against the valve seat 34.

A side yoke 28 of a magnetizable material is disposed for abutment against a region of the leaf spring 30 which is located adjacent to its outer periphery. The side yoke 28 is coupled to a yoke 36, also formed of a magnetizable material, which is in turn coupled to the stationary core 20. The side yoke 28 has a surface 28a disposed for abutment against the leaf spring 30 and which is centrally depressed in a direction toward the stationary core 20, relative to its surrounding area, thus presenting a curved surface in the central portion. Accordingly, when the leaf spring 30 carrying the side yoke 28 in abutment therewith is displaced toward the stationary core 20 as a result of the attraction exerted upon the movable core 31, the region of the leaf spring 30 which abuts against the side yoke 28a will gradually extend toward the center as the displacement increases. In other words, the fulcrum of the leaf spring 30 shifts in accordance with the displacement of the movable core 31, thus changing the size of the deformable region or the diameter of the leaf spring 30.

This causes the load applied to the leaf spring 30 to be rapidly increased as the gap between the movable core 31 and the stationary core 20 is reduced, in a manner indicated by the solid line curve in FIG. 4. In the absence of a shifting fulcrum which is produced by the side yoke 28, the load will be substantially proportional to the displacement of the movable core 31, resulting in a rectilinear response as indicated by the single dot chain line curve in FIG. 4.

On the other hand, when the coil 22 is energized with a given current, the resulting magnetic flux passes through a path including the stationary core 20, yoke 36, side yoke 28, movable core 31 and the stationary core 20, whereby there develops a force of attraction between the stationary core 20 and the movable core 31. The force of attraction will change in magnitude in accordance with the gap between the both cores 20, 31, in a manner indicated by the broken line curve shown in FIG. 4.

Figure 5A:
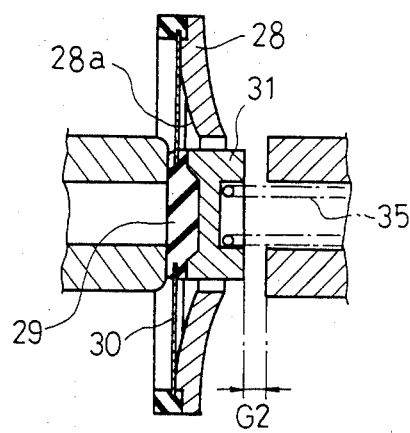
FIGS. 5a and 5b are enlarged longitudinal sections of a valve element, illustrating its relationship with the surrounding portions for gaps of two different magnitudes.
Figure 5B:
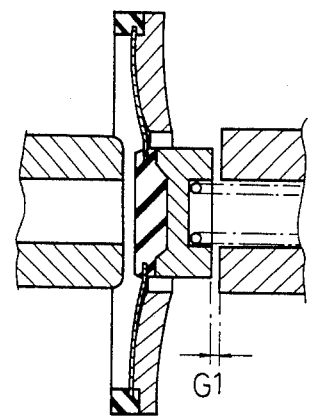

As illustrated in FIG. 5a, when the valve element 29 abuts against the valve seats 34 or when the gap has a magnitude G2 as shown in FIG. 5a, the force of attraction will be substantially greater than the load applied to the leaf spring 30, whereby the movable core 31 will be attracted by the stationary core 20. When the movable core 31 has moved to a position where the magnitude of gap is equal to G1 as indicated in FIG. 5b, the force of attraction and the load will be equal to each other in magnitude, as indicated in FIG. 4, thus stopping the movement of the movable core 31. In other words, there occurs no collision between the movable core 31 and the stationary core 20 in this example. In FIG. 1, terminals 37, 38 are electrically connected to the coil 22, and O-rings 39, 40 are provided for purpose of sealing.

Figure 6:
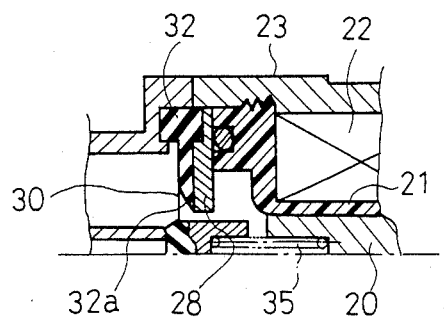
FIGS. 6 and 7 are longitudinal sections of modifications.
Figure 7:
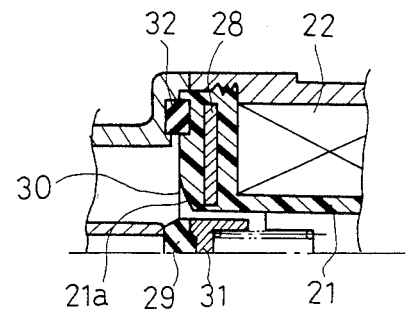

FIGS. 6 and 7 show modifications. In the embodiment shown in FIG. 6, the side yoke 28 has a planar configuration, and the lip 32 extends to the proximity of the movable core, with its surface 32a disposed for abutment against the leaf spring 30 shaped as a curved surface, thus serving the same purpose as the surface 28a of the side yoke 28 of the described embodiment. Since the lip 32 is easily deformed, its extension is supported by the side yoke 28.

In the embodiment shown in FIG. 7, one end of the bobbin 21 is extended to a location where it abuts against the leaf spring 30, with its surface 21a shaped as a curved surface for abutment. In this example, the side yoke 28 is located inside the bobbin 21.

While the surfaces 28a, 32a and 21a which support the leaf spring 30 are shaped as an arcuate curved surface in the embodiments described, any other configuration may be employed, provided such configuration allows the fulcrum of the leaf spring 30 to be changed in two or more modes. By way of example, a polygonal surface may be used. However, the configuration illustrated by the embodiments is preferred since the provision of a projection or a configuration which allows a rapid shifting of the fulcrum may result in a collision between the support means and the leaf spring.

While the leaf spring 30 has been used to support the valve element in the embodiments, it may be replaced by a diaphragm formed of rubber or the like, as is usually employed in a conventional solenoid valve. However, a shifting of the fulcrum may not be positively defined as with a metal support when such diaphragm is used, achieving a less than satisfactory result as compared with the described embodiments.

It will be seen from the foregoing that the invention avoids the occurrence of a collision of a movable part and the occurence of percussion sounds as a result of such collision, and increases the useful life, by utilizing a shifting of the fulcrum of the flexible support means.

What is claimed is:

1. A solenoid valve assembly including a casing, a core of magnetizable material secured to the casing, an electrical coil for passing a magnetic flux through the core, flexible support means in the form of a circular diaphragm having an outer periphery secured to the casing, a valve element supported by the flexible support means and disposed in opposing relationship with an end of the core for movement toward and away from the core and a rigid guide member disposed adjacent said diaphragm having a guide surface formed thereon including a region disposed for engagement by the flexible support means to shift the fulcrum of the flexible support means in accordance with the displacement of the valve element toward the core.

2. A solenoid valve assembly according to claim 1 in which the flexible support means is a metallic.

3. A solenoid valve assembly according to claim 2 in which the flexible support means includes an opening.

4. A solenoid valve assembly according to claim 3 in which the opening comprises a plurality of openings which are oblong in the circumferential direction of the flexible support means.

5. A solenoid valve assembly according to claim 1 in which the guide surface of the guide member has a curved surface extending radially inwardly.

6. A solenoid valve assembly according to claim 1 in which the guide member comprises a yoke of magnetizable material which allows a magnetic flux to be passed through the vicinity of the valve element.

7. A solenoid valve assembly according to claim 1 in which the guide member comprises an annular member having a wall thickness greater than that of the flexible support means and which is mounted around the outer periphery of the flexible support means.

8. A solenoid valve assembly according to claim 1 in which the guide member comprises part of a bobbin around which the coil is disposed.

9. A solenoid valve assembly including a casing, a core of magnetizable material secured to the casing, an electrical coil for passing a magnetic flux through the core, flexible support means in the form of a circular diaphragm having an outer periphery secured to the casing, and a valve element supported by the flexible support means and disposed in opposing relationship with an end of the core wherein said flexible support means is metallic and is formed with a plurality of circumferentially oblong openings, a guide member being disposed adjacent said diaphragm in opposing relationship with the flexible support means and formed with a curved guide surface having a region which abuts against the flexible support means and which substantially varies the fulcrum of the flexible support means in accordance with the displacement of the valve element toward the core.

10. A solenoid valve assembly according to claim 9 in which the guide member comprises a yoke of magnetizable material which allows a magnetic flux to be passed through the vicinity of the valve element.

11. A solenoid valve assembly according to claim 9 in which the guide member comprises an annular member having a wall thickness greater than that of the flexible support means and which is mounted around the outer periphery of the flexible support means.

12. A solenoid valve assembly according to claim 9 in which the guide member comprises part of a bobbin around which the coil is disposed.

* * * * *